(12) United States Patent
Berkovich et al.

(10) Patent No.: US 12,407,913 B1
(45) Date of Patent: Sep. 2, 2025

(54) LOW LATENCY HIERARCHICAL IMAGE CAPTURE

(71) Applicant: Meta Platforms Technologies, LLC, Menlo Park, CA (US)

(72) Inventors: Andrew Samuel Berkovich, Sammamish, WA (US); Ziyun Li, Bellevue, WA (US); Reid Frederick Pinkham, Bellevue, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 153 days.

(21) Appl. No.: 18/481,867

(22) Filed: Oct. 5, 2023

Related U.S. Application Data

(60) Provisional application No. 63/414,372, filed on Oct. 7, 2022.

(51) Int. Cl.
*H04N 23/61* (2023.01)
*G06V 10/25* (2022.01)
*G06V 10/764* (2022.01)
*G06V 10/98* (2022.01)

(52) U.S. Cl.
CPC ............. *H04N 23/61* (2023.01); *G06V 10/25* (2022.01); *G06V 10/764* (2022.01); *G06V 10/993* (2022.01)

(58) Field of Classification Search
CPC ...... H04N 23/61; G06V 10/25; G06V 10/993; G06V 10/764

USPC ...................................................... 348/222.1
See application file for complete search history.

(56) References Cited

U.S. PATENT DOCUMENTS

| | | | |
|---|---|---|---|
| 9,706,131 B2* | 7/2017 | Kobayashi | H04N 25/589 |
| 11,847,808 B2* | 12/2023 | Park | G06F 17/18 |
| 2006/0245640 A1* | 11/2006 | Szczuka | G06T 5/50 |
| | | | 382/154 |
| 2009/0003678 A1* | 1/2009 | Cutler | H04N 7/142 |
| | | | 382/132 |
| 2015/0358552 A1* | 12/2015 | Kobayashi | H04N 23/743 |
| | | | 348/239 |
| 2019/0222769 A1* | 7/2019 | Srivastava | H04N 23/63 |
| 2020/0025696 A1* | 1/2020 | Potocek | H01J 37/222 |
| 2020/0294234 A1* | 9/2020 | Rance | G06F 18/22 |
| 2020/0321102 A1* | 10/2020 | Barnes | G06V 20/695 |
| 2021/0110190 A1* | 4/2021 | Park | H04N 23/71 |
| 2021/0224957 A1* | 7/2021 | Iwase | G06V 40/193 |
| 2022/0398704 A1* | 12/2022 | Sun | G06T 5/70 |

* cited by examiner

*Primary Examiner* — Pritham D Prabhakher
(74) *Attorney, Agent, or Firm* — Freestone Intellectual Property Law PLLC; Aaron J. Visbeek

(57) ABSTRACT

Features described herein pertain to low latency hierarchical image capture. An image can be captured using a pixel array of an image sensing system. A region-of-interest (ROI) can be detected in the image. Image characteristics of the image can be determined based on the region-of-interest (ROI). Determining the image characteristics of the image can include determining an image quality level of the region-of-interest (ROI). Image capturing instructions for capturing a set of images can be determined based on the image characteristics. The set of images can be combined into an image and an object can be recognized in the image.

20 Claims, 11 Drawing Sheets

LOW LATENCY HIERARCHICAL IMAGE CAPTURE

CROSS-REFERENCE TO RELATED APPLICATIONS

This application claims priority to, and the benefit of U.S. Provisional Patent Application No. 63/414,372, filed Oct. 7, 2022, the entire disclosure of which is incorporated by reference in its entirety for all purposes.

BACKGROUND

Computer vision tasks have become an integral part of image processing pipelines. Image processing pipelines often rely on computer vision tasks to understand scenes and facilitate control of electronic devices. Performance of a computer vision task generally improves when multiple high-resolution images are used to perform the task. Typically, image capture is facilitated by always-on image sensors and intelligent controllers. However, these image sensors and intelligent controllers are often included in power-constrained systems. Additionally, a computer vision task is often performed by using a first image in a sequence of images to identify relevant scene content and performing subtasks of the computer vision task based on the relevant scene content included subsequent images of the image sequence. However, scene content can change between the initial identification and performance of the subtasks. Therefore, it may be desirable to provide low latency power-aware image capture.

SUMMARY

Embodiments described herein pertain to low latency hierarchical image capture.

In various embodiments, a method includes capturing, using a pixel array of an image sensing system, a first image; detecting a region-of-interest in the first image; determining a plurality of image characteristics of the first image, wherein determining the plurality of image characteristics of the first image comprises determining an image quality level of the region-of-interest; determining, based on the plurality of image characteristics, image capturing instructions for capturing a set of second images; capturing, using the pixel array of the image sensing system, the set of second images; combining the set of second images into a third image; and recognizing the object in the third image.

In some embodiments, the plurality of image characteristics is determined using a processing subsystem of the image sensing system.

In some embodiments, determining the image quality level of the region-of-interest comprises determining at least one of a brightness level of the region-of-interest and a blur level of the region-of-interest.

In some embodiments, a number of images included in the set of second images is defined by the image capturing instructions.

In some embodiments, the set of second images is captured within a period of time defined by the image capturing instructions.

In some embodiments, combining the set of second images comprises registering each image of the set of second images to one another to form a set of registered images and merging images in the set of registered images to form the third image.

In some embodiments, recognizing the object in the third image includes detecting a region-of-interest in the third image, wherein coordinates of the region-of-interest in the third image correspond to coordinates of the region-of-interest in the first image; detecting an object in the region-of-interest in the third image; and classifying the object detected in the region-of-interest in the third image.

Some embodiments include an imaging system including an image sensing system and a processing system, wherein the imaging system is configured to perform part or all of the operations and/or methods disclosed herein.

Some embodiments include one or more non-transitory computer-readable media storing instructions which, when executed by one or more processors, cause an imaging system to perform part or all of the operations and/or methods disclosed herein.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1A:
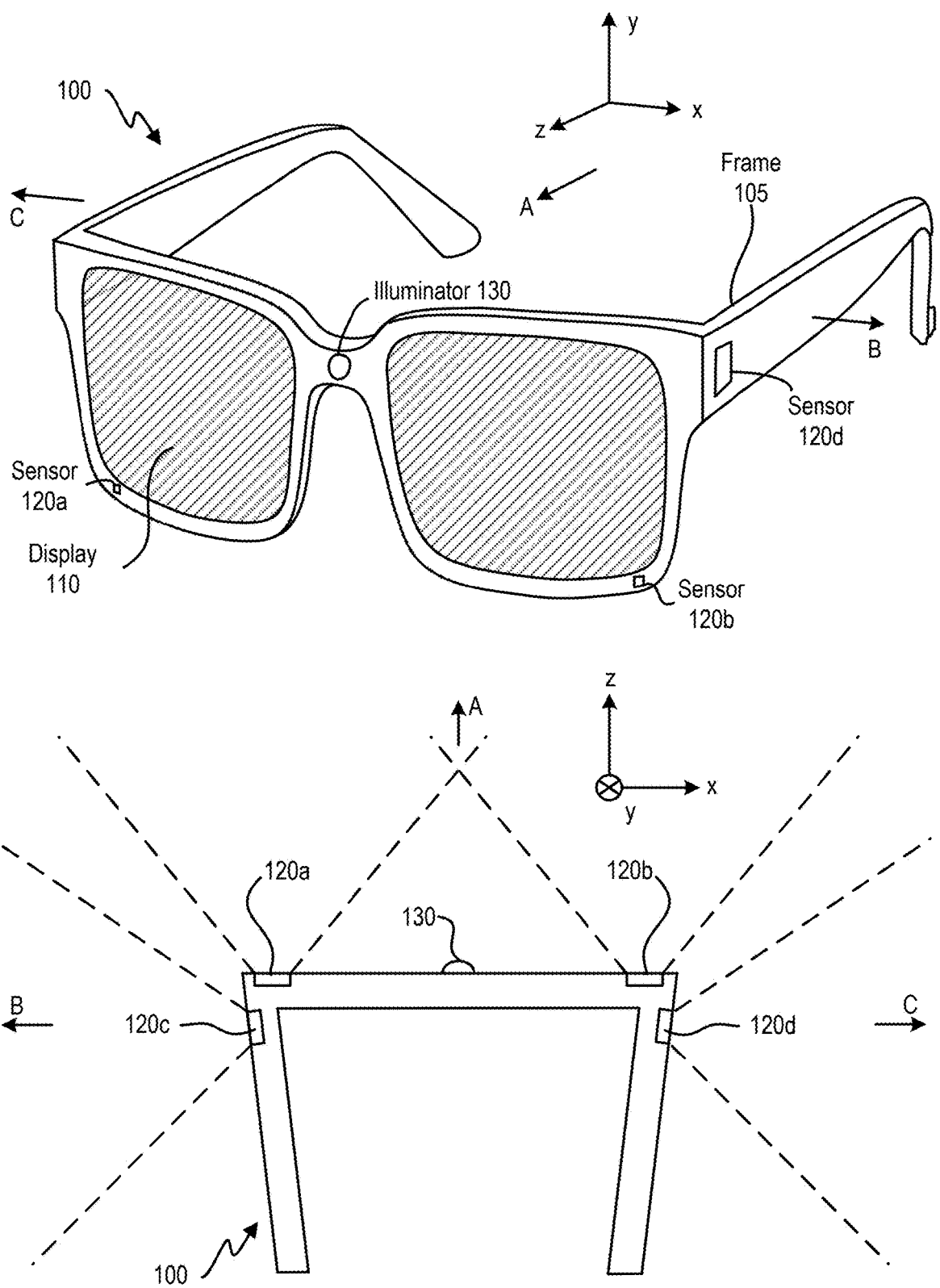
FIG. 1A and FIG. 1B are diagrams of an embodiment of a near-eye display.

Examples are described herein in the context of hierarchical image capture. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Vision-based, contextual artificial intelligence ("AI") assistants used in augmented reality ("AR") and virtual reality ("VR") systems typically rely always-on cameras and machine vision systems. Always-on cameras and machine vision systems enable the extraction of meaningful information from the world that can be used by the AI assistants to understand a user's intent, goals, and the focus of their attention. One important example involves the detection and recognition of characters, text, and codes (e.g., quick response codes). AI assistants can use the recognized characters, text, and codes to facilitate understanding an environment in which the AI assistant is located and/or assisting the user with performing a task.

Characters, text, and codes are typically detected and recognized using optical character recognition ("OCR") techniques. Often, to improve OCR performance, high-resolution image sensors are used to capture high resolution full-frames images of a scene. High-resolution imaging facilitates the capture of high frequency image content, which in turn typically yields an improvement in the performance of the OCR performed on the captured images especially when those images depict characters, text, and codes in a smaller font size and/or at distance from the image sensor. However, capturing high-resolution full-frame images utilizes significant system power and compute resources.

OCR performance can also depend on image quality factors such as image noise, lighting conditions, image sharpness, and the like. To compensate for these factors, burst capture and multi-frame image capture techniques are often relied upon. These techniques typically involve capturing a sequence of images of a scene and using these images to reconstruct a high-quality higher-resolution image of the scene. However, these techniques also utilize significant system power and compute resources. In some cases, power and compute resource savings may be achieved by capturing an initial image and assessing image quality of the initial image to determine whether the quality of the initial image is sufficient enough such that burst capture or multi-frame image capture does not need to be performed. However, this arrangement often results in poor latency between the time the initial image is captured and the time the burst capture or multi-frame image capture is initiated. As such, the regions-of-interest (ROIs) in the initial image are often not included in the images of the burst capture or multi-frame image capture.

The techniques described herein address these challenges and/or others by providing low latency hierarchical image capture. Initially, a first image can be captured using a pixel array of an image sensing system. A determination can be made as to whether a region-of-interest (ROI) is detected in the first image. In the case that it is determined that a region-of-interest (ROI) is not detected in the first image, another first image can be captured. In the case that it is determined that a region-of-interest (ROI) is detected in the first image, hierarchical image capture can be performed. To perform hierarchical image capture, image characteristics of the first image can be determined based on the region-of-interest (ROI). Determining the image characteristics of the first image can include determining an image quality level of the region-of-interest (ROI), where determining the image quality level of the region-of-interest (ROI) can include determining at least one of a brightness level of the region-of-interest (ROI) and a blur level of the object in the region-of-interest (ROI). The image characteristics can be determined using a processing subsystem of the image sensing system. Image capturing instructions for capturing a set of second images can be determined based on the image characteristics. A number of images included in the set of second images can be defined by the image capturing instructions and the set of second images is captured within a period of time defined by the image capturing instructions. The set of second images can be captured using the pixel array of the image sensing system based on the image capturing instruction. The set of second images can be combined into a third image by registering each image of the set of second images to one another to form a set of registered images and merging images in the set of registered images to form the third image. An object can be recognized in the third image by detecting a region-of-interest (ROI) in the third image, detecting an object in the region-of-interest (ROI) in the third image, and classifying the object detected in the region-of-interest (ROI) in the third image. Coordinates of the region-of-interest (ROI) in the third image can correspond to coordinates of the region-of-interest (ROI) in the first image.

The foregoing illustrative example is given to introduce the reader to the general subject matter discussed herein and the disclosure is not limited to this example. The following sections describe various additional non-limiting examples and examples of low latency hierarchical image capture.

FIG. 1A is a diagram of an embodiment of a near-eye display 100. Near-eye display 100 presents media to a user. Examples of media presented by near-eye display 100 include one or more images, video, and/or audio. In some embodiments, audio is presented via an external device (e.g., speakers and/or headphones) that receives audio information from the near-eye display 100, a console, or both, and presents audio data based on the audio information. Near-eye display 100 is generally configured to operate as a virtual reality (VR) display. In some embodiments, near-eye display 100 is modified to operate as an augmented reality (AR) display and/or a mixed reality (MR) display.

Near-eye display 100 includes a frame 105 and a display 110. Frame 105 is coupled to one or more optical elements. Display 110 is configured for the user to see content presented by near-eye display 100. In some embodiments, display 110 comprises a waveguide display assembly for directing light from one or more images to an eye of the user.

Near-eye display 100 further includes image sensors 120a, 120b, 120c, and 120d. Each of image sensors 120a, 120b, 120c, and 120d may include a pixel array configured to generate image data representing different fields of views along different directions. For example, image sensors 120a and 120b may be configured to provide image data representing two fields of view towards a direction A along the Z axis, whereas image sensor 120c may be configured to provide image data representing a field of view towards a direction B along the X axis, and image sensor 120d may be configured to provide image data representing a field of view towards a direction C along the X axis.

In some embodiments, image sensors 120a-120d can be configured as input devices to control or influence the display content of the near-eye display 100 to provide an interactive VR/AR/MR experience to a user who wears near-eye display 100. For example, image sensors 120a-120d can generate physical image data of a physical environment in which the user is located. The physical image data can be provided to a location tracking system to track a location and/or a path of movement of the user in the physical environment. A system can then update the image data provided to display 110 based on, for example, the location and orientation of the user, to provide the interactive experience. In some embodiments, the location tracking system may operate a SLAM algorithm to track a set of objects in the physical environment and within a view of field of the user as the user moves within the physical environment. The location tracking system can construct and update a map of the physical environment based on the set of objects and track the location of the user within the map. By providing image data corresponding to multiple fields of views, image sensors 120a-120d can provide the location tracking system a more holistic view of the physical environment, which can lead to more objects to be included in the construction and updating of the map. With such an arrangement, the accuracy and robustness of tracking a location of the user within the physical environment can be improved.

In some embodiments, near-eye display 100 may further include one or more active illuminators 130 to project light into the physical environment. The light projected can be associated with different frequency spectrums (e.g., visible light, infra-red light, ultra-violet light), and can serve various purposes. For example, illuminator 130 may project light in a dark environment (or in an environment with low intensity of infra-red light, ultra-violet light, etc.) to assist image sensors 120a-120d in capturing images of different objects within the dark environment to, for example, enable location tracking of the user. Illuminator 130 may project certain markers onto the objects within the environment, to assist the location tracking system in identifying the objects for map construction/updating.

In some embodiments, illuminator 130 may also enable stereoscopic imaging. For example, one or more of image sensors 120a or 120b can include both a first pixel array for visible light sensing and a second pixel array for infra-red (IR) light sensing. The first pixel array can be overlaid with a color filter (e.g., a Bayer filter), with each pixel of the first pixel array being configured to measure intensity of light associated with a particular color (e.g., one of red, green or blue colors). The second pixel array (for IR light sensing) can also be overlaid with a filter that allows only IR light through, with each pixel of the second pixel array being configured to measure intensity of IR lights. The pixel arrays can generate an RGB image and an IR image of an object, with each pixel of the IR image being mapped to each pixel of the RGB image. Illuminator 130 may project a set of IR markers on the object, the images of which can be captured by the IR pixel array. Based on a distribution of the IR markers of the object as shown in the image, the system can estimate a distance of different parts of the object from the IR pixel array and generate a stereoscopic image of the object based on the distances. Based on the stereoscopic image of the object, the system can determine, for example, a relative position of the object with respect to the user and can update the image data provided to display 100 based on the relative position information to provide the interactive experience.

As discussed above, near-eye display 100 may be operated in environments associated with a very wide range of light intensities. For example, near-eye display 100 may be operated in an indoor environment or in an outdoor environment, and/or at different times of the day. Near-eye display 100 may also operate with or without active illuminator 130 being turned on. As a result, image sensors 120a-120d may need to have a wide dynamic range to be able to operate properly (e.g., to generate an output that correlates with the intensity of incident light) across a very wide range of light intensities associated with different operating environments for near-eye display 100.

Figure 1B:
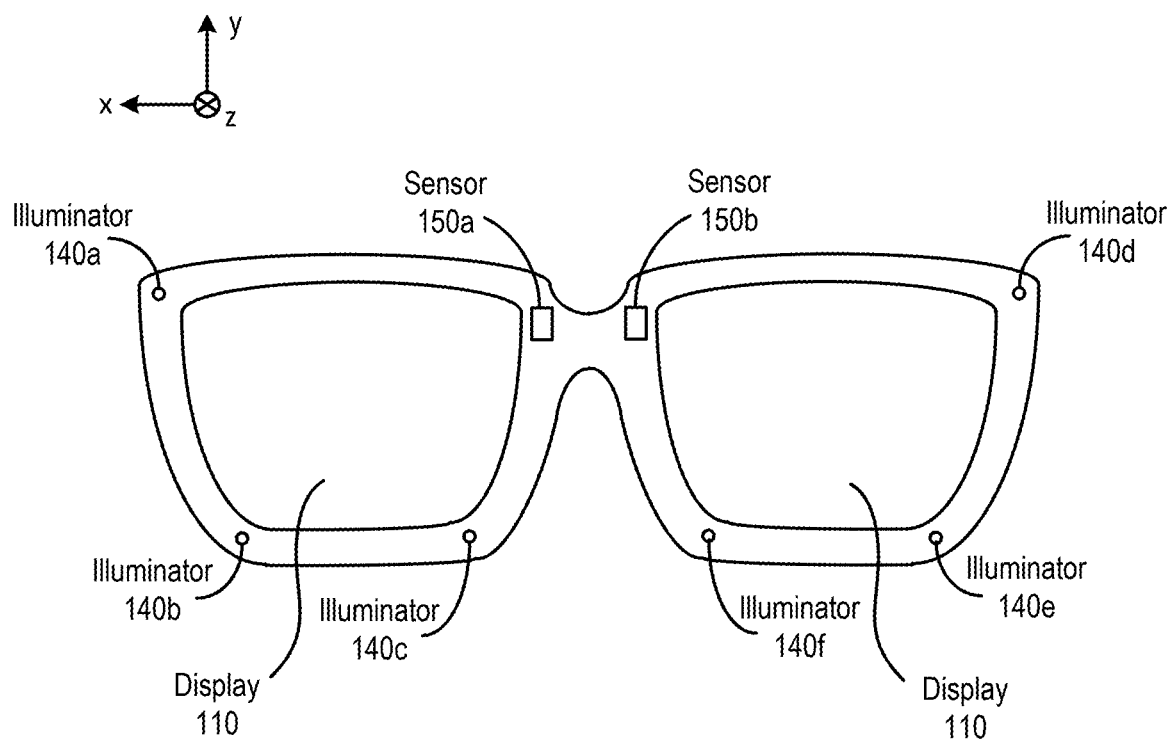
Figure 1B:
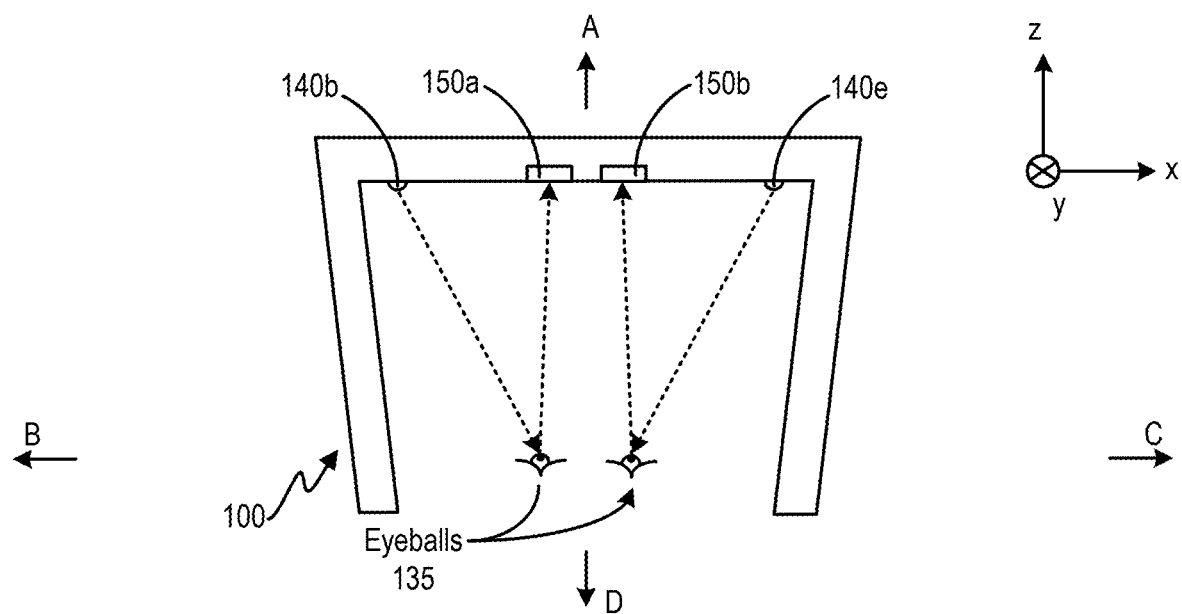

FIG. 1B is a diagram of another embodiment of near-eye display 100. FIG. 1B illustrates a side of near-eye display 100 that faces the eyeball(s) 135 of the user who wears near-eye display 100. As shown in FIG. 1B, near-eye display 100 may further include a plurality of illuminators 140a, 140b, 140c, 140d, 140e, and 140f. Near-eye display 100 further includes a plurality of image sensors 150a and 150b. Illuminators 140a, 140b, and 140c may emit lights of certain frequency range (e.g., NIR) towards direction D (which is opposite to direction A of FIG. 1A). The emitted light may be associated with a certain pattern and can be reflected by the left eyeball of the user. Image sensor 150a may include a pixel array to receive the reflected light and generate an image of the reflected pattern. Similarly, illuminators 140d, 140e, and 140f may emit NIR lights carrying the pattern. The NIR lights can be reflected by the right eyeball of the user and may be received by image sensor 150b. Image sensor 150b may also include a pixel array to generate an image of the reflected pattern. Based on the images of the reflected pattern from image sensors 150a and 150b, the system can determine a gaze point of the user and update the image data provided to display 100 based on the determined gaze point to provide an interactive experience to the user.

As discussed above, to avoid damaging the eyeballs of the user, illuminators 140a, 140b, 140c, 140d, 140e, and 140f are typically configured to output lights of very low intensities. In a case where image sensors 150a and 150b comprise the same sensor devices as image sensors 120a-120d of FIG. 1A, the image sensors 120a-120d may need to be able to generate an output that correlates with the intensity of incident light when the intensity of the incident light is very low, which may further increase the dynamic range requirement of the image sensors.

Moreover, the image sensors 120a-120d may need to be able to generate an output at a high speed to track the movements of the eyeballs. For example, a user's eyeball can perform a very rapid movement (e.g., a saccade movement) in which there can be a quick jump from one eyeball position to another. To track the rapid movement of the user's eyeball, image sensors 120a-120d need to generate images of the eyeball at high speed. For example, the rate at which the image sensors generate an image frame (the frame rate) needs to at least match the speed of movement of the eyeball. The high frame rate requires short total exposure time for all of the pixel cells involved in generating the image frame, as well as high speed for converting the image sensor outputs into digital values for image generation. Moreover, as discussed above, the image sensors also need to be able to operate at an environment with low light intensity.

Figure 2:
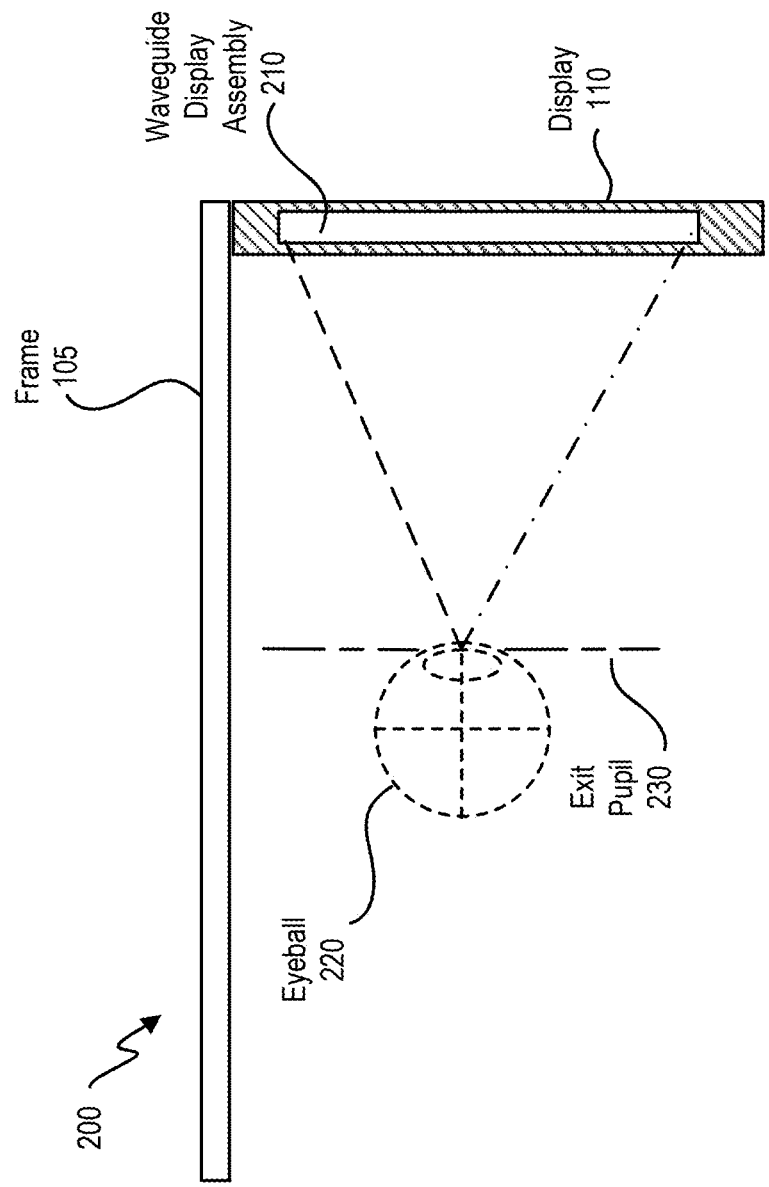
FIG. 2 is an embodiment of a cross section of the near-eye display.

FIG. 2 is an embodiment of a cross section 200 of near-eye display 100 illustrated in FIGS. 1A and 1B. Display 110 includes at least one waveguide display assembly 210. An exit pupil 230 is a location where a single eyeball 220 of the user is positioned in an eyebox region when the user wears the near-eye display 100. For purposes of illustration, FIG. 2 shows the cross section 200 associated eyeball 220 and a single waveguide display assembly 210, but a second waveguide display is used for a second eye of a user.

Waveguide display assembly 210 is configured to direct image light to an eyebox located at exit pupil 230 and to eyeball 220. Waveguide display assembly 210 may be composed of one or more materials (e.g., plastic, glass) with one or more refractive indices. In some embodiments, near-eye display 100 includes one or more optical elements between waveguide display assembly 210 and eyeball 220.

In some embodiments, waveguide display assembly 210 includes a stack of one or more waveguide displays including, but not restricted to, a stacked waveguide display, a varifocal waveguide display, etc. The stacked waveguide display is a polychromatic display (e.g., a red-green-blue—RGB—display) created by stacking waveguide displays whose respective monochromatic sources are of different colors. The stacked waveguide display is also a polychromatic display that can be projected on multiple planes (e.g., multi-planar colored display). In some configurations, the stacked waveguide display is a monochromatic display that can be projected on multiple planes (e.g., multi-planar monochromatic display). The varifocal waveguide display is a display that can adjust a focal position of image light emitted from the waveguide display. In alternate embodiments, waveguide display assembly 210 may include the stacked waveguide display and the varifocal waveguide display.

Figure 3:
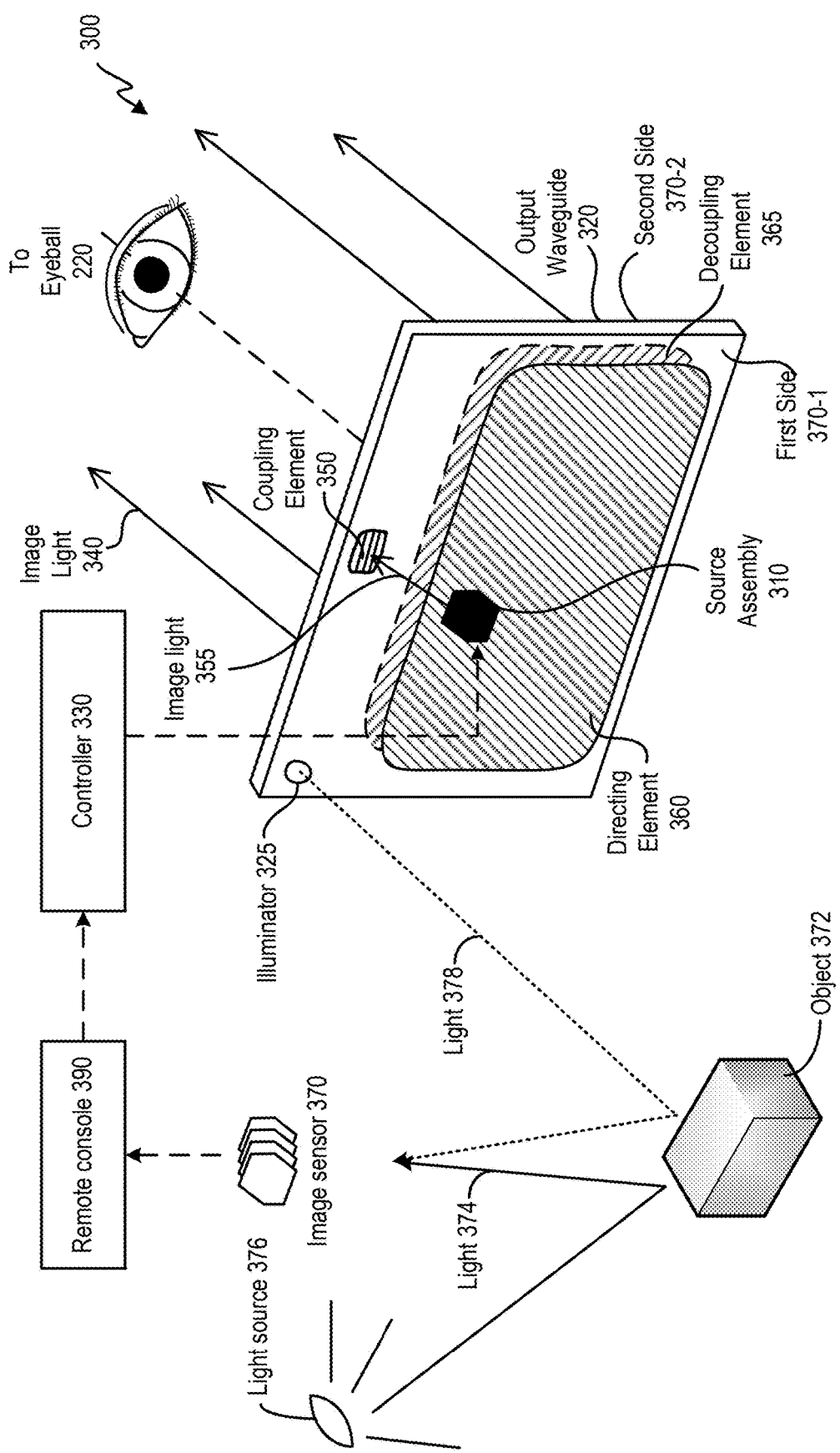
FIG. 3 illustrates an isometric view of an embodiment of a waveguide display with a single source assembly.

FIG. 3 illustrates an isometric view of an embodiment of a waveguide display 300. In some embodiments, waveguide display 300 is a component (e.g., waveguide display assembly 210) of near-eye display 100. In some embodiments, waveguide display 300 is part of some other near-eye display or other system that directs image light to a particular location.

Waveguide display 300 includes a source assembly 310, an output waveguide 320, and a controller 330. For purposes of illustration, FIG. 3 shows the waveguide display 300 associated with a single eyeball 220, but in some embodiments, another waveguide display separate, or partially separate, from the waveguide display 300 provides image light to another eye of the user.

Source assembly 310 generates and outputs image light 355 to a coupling element 350 located on a first side 370-1 of output waveguide 320. Output waveguide 320 is an optical waveguide that outputs expanded image light 340 to an eyeball 220 of a user. Output waveguide 320 receives image light 355 at one or more coupling elements 350 located on the first side 370-1 and guides received input image light 355 to a directing element 360. In some embodiments, coupling element 350 couples the image light 355 from source assembly 310 into output waveguide 320. Coupling element 350 may be, e.g., a diffraction grating, a holographic grating, one or more cascaded reflectors, one or more prismatic surface elements, and/or an array of holographic reflectors.

Directing element 360 redirects the received input image light 355 to decoupling element 365 such that the received input image light 355 is decoupled out of output waveguide 320 via decoupling element 365. Directing element 360 is part of, or affixed to, first side 370-1 of output waveguide 320. Decoupling element 365 is part of, or affixed to, second side 370-2 of output waveguide 320, such that directing element 360 is opposed to the decoupling element 365. Directing element 360 and/or decoupling element 365 may be, e.g., a diffraction grating, a holographic grating, one or more cascaded reflectors, one or more prismatic surface elements, and/or an array of holographic reflectors.

Second side 370-2 represents a plane along an x-dimension and a y-dimension. Output waveguide 320 may be composed of one or more materials that facilitate total internal reflection of image light 355. Output waveguide 320 may be composed of e.g., silicon, plastic, glass, and/or polymers. Output waveguide 320 has a relatively small form factor. For example, output waveguide 320 may be approximately 50 mm wide along x-dimension, 30 mm long along y-dimension and 0.5-1 mm thick along a z-dimension.

Controller 330 controls scanning operations of source assembly 310. The controller 330 determines scanning instructions for the source assembly 310. In some embodiments, the output waveguide 320 outputs expanded image light 340 to the user's eyeball 220 with a large field of view (FOV). For example, the expanded image light 340 is provided to the user's eyeball 220 with a diagonal FOV (in x and y) of 60 degrees and/or greater and/or 150 degrees and/or less. The output waveguide 320 is configured to provide an eyebox with a length of 20 mm or greater and/or equal to or less than 50 mm; and/or a width of 10 mm or greater and/or equal to or less than 50 mm.

Moreover, controller 330 also controls image light 355 generated by source assembly 310, based on image data provided by image sensor 370. Image sensor 370 may be located on first side 370-1 and may include, for example, image sensors 120a-120d of FIG. 1A. Image sensors 120a-120d can be operated to perform 2D sensing and 3D sensing of, for example, an object 372 in front of the user (e.g., facing first side 370-1). For 2D sensing, each pixel cell of image sensors 120a-120d can be operated to generate pixel data representing an intensity of light 374 generated by a light source 376 and reflected off object 372. For 3D sensing, each pixel cell of image sensors 120a-120d can be operated to generate pixel data representing a time-of-flight for light 378 generated by illuminator 325. For example, each pixel cell of image sensors 120a-120d can determine a first time when illuminator 325 is enabled to project light 378 and a second time when the pixel cell detects light 378 reflected off object 372. The difference between the first time and the second time can indicate the time-of-flight of light 378 between image sensors 120a-120d and object 372, and the time-of-flight information can be used to determine a distance between image sensors 120a-120d and object 372. Image sensors 120a-120d can be operated to perform 2D and 3D sensing at different times and provide the 2D and 3D image data to a remote console 390 that may be (or may not be) located within waveguide display 300. The remote console may combine the 2D and 3D images to, for example, generate a 3D model of the environment in which the user is located, to track a location and/or orientation of the user, etc. The remote console may determine the content of the images to be displayed to the user based on the information derived from the 2D and 3D images. The remote console can transmit instructions to controller 330 related to the determined content. Based on the instructions, controller 330 can control the generation and outputting of image light 355 by source assembly 310, to provide an interactive experience to the user.

Figure 4:
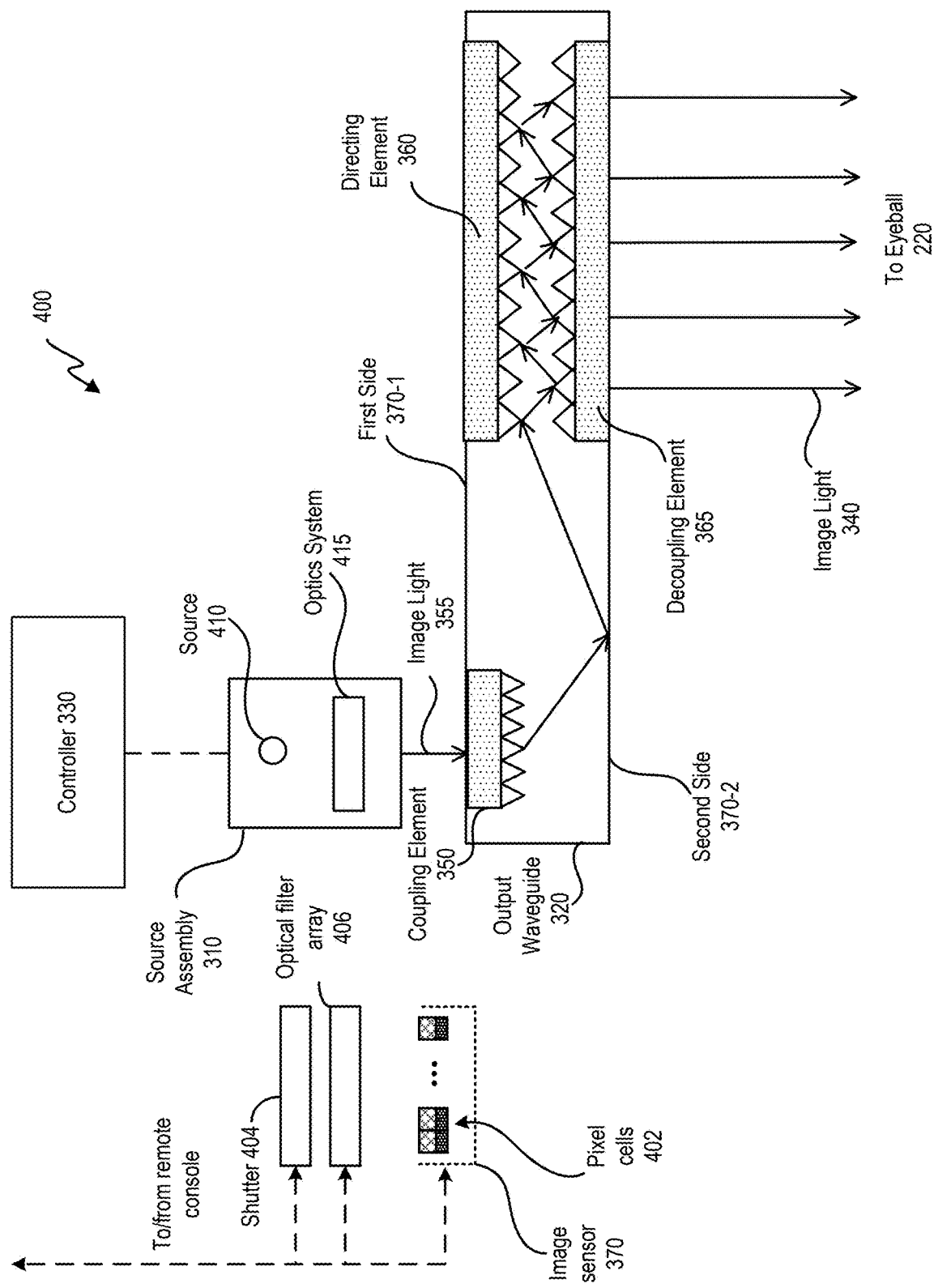
FIG. 4 illustrates a cross section of an embodiment of the waveguide display.

FIG. 4 illustrates an embodiment of a cross section 400 of the waveguide display 300. The cross section 400 includes source assembly 310, output waveguide 320, and image sensor 370. In the example of FIG. 4, image sensor 370 may include a set of pixel cells 402 located on first side 370-1 to generate an image of the physical environment in front of the user. In some embodiments, there can be a mechanical shutter 404 and an optical filter array 406 interposed between the set of pixel cells 402 and the physical environment. Mechanical shutter 404 can control the exposure of the set of pixel cells 402. In some embodiments, the mechanical shutter 404 can be replaced by an electronic shutter gate, as to be discussed below. Optical filter array 406 can control an optical wavelength range of light the set of pixel cells 402 is exposed to, as to be discussed below. Each of pixel cells 402 may correspond to one pixel of the image. Although not shown in FIG. 4, it is understood that each of pixel cells 402 may also be overlaid with a filter to control the optical wavelength range of the light to be sensed by the pixel cells.

After receiving instructions from the remote console, mechanical shutter 404 can open and expose the set of pixel cells 402 in an exposure period. During the exposure period, image sensor 370 can obtain samples of lights incident on the set of pixel cells 402 and generate image data based on an intensity distribution of the incident light samples detected by the set of pixel cells 402. Image sensor 370 can then provide the image data to the remote console, which determines the display content, and provide the display content information to controller 330. Controller 330 can then determine image light 355 based on the display content information.

Source assembly 310 generates image light 355 in accordance with instructions from the controller 330. Source assembly 310 includes a source 410 and an optics system 415. Source 410 is a light source that generates coherent or partially coherent light. Source 410 may be, e.g., a laser diode, a vertical cavity surface emitting laser, and/or a light emitting diode.

Optics system 415 includes one or more optical components that condition the light from source 410. Conditioning light from source 410 may include, e.g., expanding, collimating, and/or adjusting orientation in accordance with instructions from controller 330. The one or more optical components may include one or more lenses, liquid lenses, mirrors, apertures, and/or gratings. In some embodiments, optics system 415 includes a liquid lens with a plurality of electrodes that allows scanning of a beam of light with a threshold value of scanning angle to shift the beam of light to a region outside the liquid lens. Light emitted from the optics system 415 (and also source assembly 310) is referred to as image light 355.

Output waveguide 320 receives image light 355. Coupling element 350 couples image light 355 from source assembly 310 into output waveguide 320. In embodiments where coupling element 350 is a diffraction grating, a pitch of the diffraction grating is chosen such that total internal reflection occurs in output waveguide 320, and image light 355 propagates internally in output waveguide 320 (e.g., by total internal reflection), toward decoupling element 365.

Directing element 360 redirects image light 355 toward decoupling element 365 for decoupling from output waveguide 320. In embodiments where directing element 360 is a diffraction grating, the pitch of the diffraction grating is chosen to cause incident image light 355 to exit output waveguide 320 at angle(s) of inclination relative to a surface of decoupling element 365.

In some embodiments, directing element 360 and/or decoupling element 365 are structurally similar. Expanded image light 340 exiting output waveguide 320 is expanded along one or more dimensions (e.g., may be elongated along x-dimension). In some embodiments, waveguide display 300 includes a plurality of source assemblies 310 and a plurality of output waveguides 320. Each of source assemblies 310 emits a monochromatic image light of a specific band of wavelength corresponding to a primary color (e.g., red, green, or blue). Each of output waveguides 320 may be stacked together with a distance of separation to output an expanded image light 340 that is multi-colored.

Figure 5:
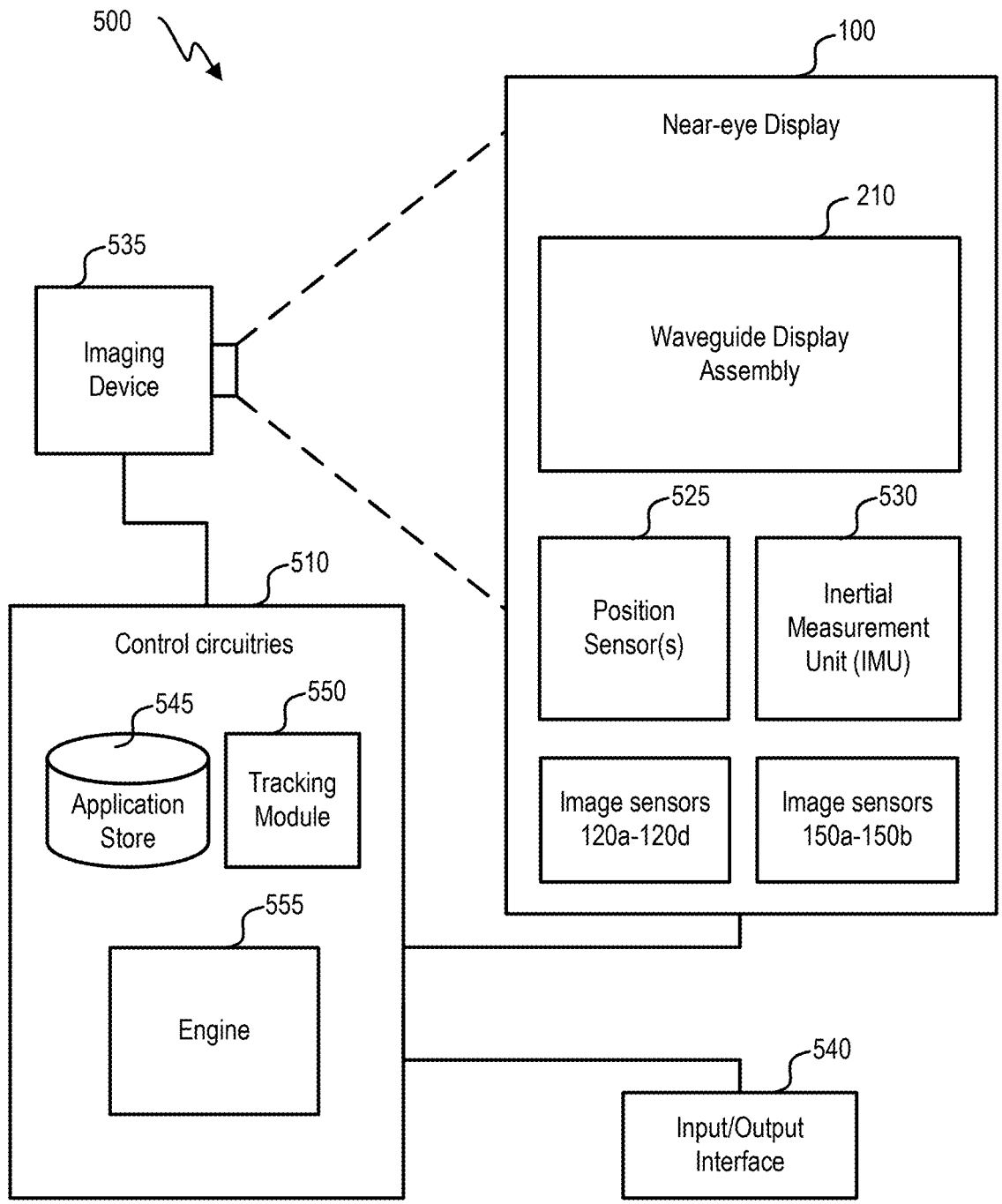
FIG. 5 is a block diagram of an embodiment of a system including the near-eye display.

FIG. 5 is a block diagram of an embodiment of a system 500 including the near-eye display 100. The system 500 comprises near-eye display 100, an imaging device 535, an input/output interface 540, and image sensors 120a-120d and 150a-150b that are each coupled to control circuitries 510. System 500 can be configured as a head-mounted device, a mobile device, a wearable device, etc.

Near-eye display 100 is a display that presents media to a user. Examples of media presented by the near-eye display 100 include one or more images, video, and/or audio. In some embodiments, audio is presented via an external device (e.g., speakers and/or headphones) that receives audio information from near-eye display 100 and/or control circuitries 510 and presents audio data based on the audio information to a user. In some embodiments, near-eye display 100 may also act as an AR eyewear glass. In some embodiments, near-eye display 100 augments views of a physical, real-world environment, with computer-generated elements (e.g., images, video, sound).

Near-eye display 100 includes waveguide display assembly 210, one or more position sensors 525, and/or an inertial measurement unit (IMU) 530. Waveguide display assembly 210 includes source assembly 310, output waveguide 320, and controller 330. IMU 530 is an electronic device that generates fast calibration data indicating an estimated position of near-eye display 100 relative to an initial position of near-eye display 100 based on measurement signals received from one or more of position sensors 525.

Imaging device 535 may generate image data for various applications. For example, imaging device 535 may generate image data to provide slow calibration data in accordance with calibration parameters received from control circuitries 510. Imaging device 535 may include, for example, image sensors 120a-120d of FIG. 1A for generating image data of a physical environment in which the user is located for performing location tracking of the user. Imaging device 535 may further include, for example, image sensors 150a-150b of FIG. 1B for generating image data for determining a gaze point of the user to identify an object of interest of the user.

The input/output interface 540 is a device that allows a user to send action requests to the control circuitries 510. An action request is a request to perform a particular action. For example, an action request may be to start or end an application or to perform a particular action within the application.

Control circuitries 510 provide media to near-eye display 100 for presentation to the user in accordance with information received from one or more of: imaging device 535, near-eye display 100, and input/output interface 540. In some examples, control circuitries 510 can be housed within system 500 configured as a head-mounted device. In some examples, control circuitries 510 can be a standalone console device communicatively coupled with other components of system 500. In the example shown in FIG. 5, control circuitries 510 include an application store 545, a tracking module 550, and an engine 555.

The application store 545 stores one or more applications for execution by the control circuitries 510. An application is a group of instructions that, when executed by a processor, generates content for presentation to the user. Examples of applications include gaming applications, conferencing applications, video playback applications, and/or other suitable applications.

Tracking module 550 calibrates system 500 using one or more calibration parameters and may adjust one or more calibration parameters to reduce error in determination of the position of the near-eye display 100.

Tracking module 550 tracks movements of near-eye display 100 using slow calibration information from the imaging device 535. Tracking module 550 also determines positions of a reference point of near-eye display 100 using position information from the fast calibration information.

Engine 555 executes applications within system 500 and receives position information, acceleration information, velocity information, and/or predicted future positions of near-eye display 100 from tracking module 550. In some embodiments, information received by engine 555 may be used for producing a signal (e.g., display instructions) to waveguide display assembly 210 that determines a type of content presented to the user. For example, to provide an interactive experience, engine 555 may determine the content to be presented to the user based on a location of the user (e.g., provided by tracking module 550), or a gaze point of the user (e.g., based on image data provided by imaging device 535), a distance between an object and user (e.g., based on image data provided by imaging device 535).

Figure 6:
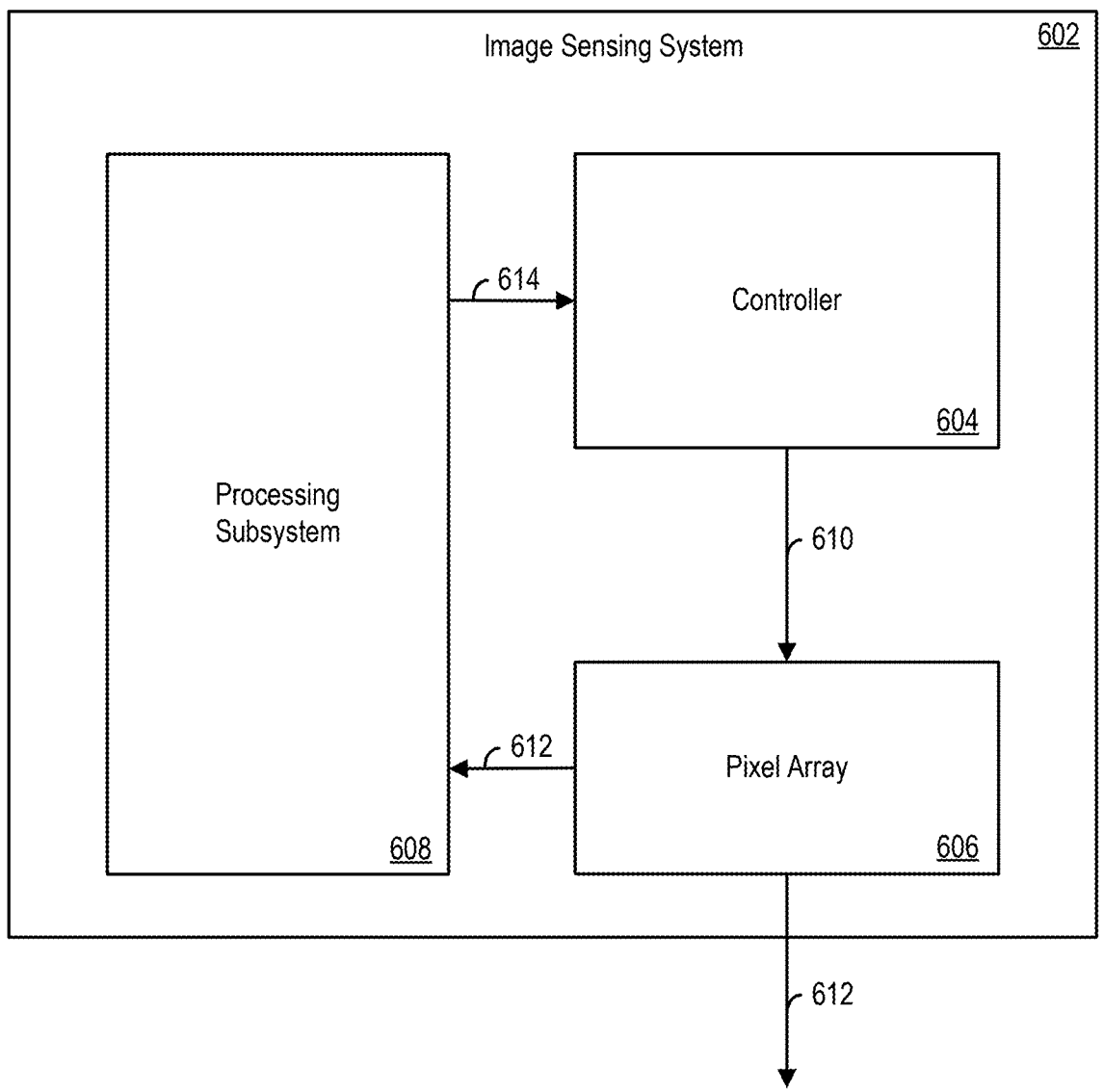
FIG. 6 illustrates an example of an image sensing system according to some implementations of the present disclosure.

FIG. 6 illustrates an example of an image sensing system 602. As shown in FIG. 6, image sensing system 602 includes a controller 604, a pixel array 606, and a processing subsystem 608. Controller 604 is configured to receive image capturing instructions 614 generated by the processing subsystem 608 and generate control signals 610 for controlling the pixel array 606 to capture images based on the image capturing instructions 614. In some implementations, the controller 604 can be implemented as an application specific integrated circuit (ASIC), a field programmable gate array (FPGA), or a hardware processor that executes the image capturing instructions 614 and generates the control signals 610. In some implementations, the controller 604 includes one or more registers for mapping the image capturing instructions 614 to the control signals 610. The pixel array 606 is configured to capture images based on the control signals 610. For example, the control signals 610 can control circuitry included in the pixel array 606. Examples of such circuitry includes, but is not limited to, circuitry for collecting light (e.g., photodiodes), selecting rows, storing charges (e.g., floating diffusions), converting voltages to pixel values (e.g., analog-to-digital conversion (ADC) circuitry), and the like. In order to capture images, each pixel of the pixel array 606 is configured to receive incoming light (e.g., natural ambient light, artificial ambient light, light from reflected from the scene, etc.), convert the received light into an electric charge, and store a voltage corresponding to the electric charge on a charge storage device for the respective pixel. The voltage stored on the charge storage device for a respective pixel can be provided to ADC circuitry for conversion into a pixel value for the respective pixel which can be read out from the pixel array 606. Images can be formed by selectively reading out the pixel values from the pixel array 606. Although not shown, the image sensing system 602 can also include other circuitry such as ramp generators, bias generators, amplifiers, power supplies, and the like for facilitating image capture. In some implementations, the controller 604 can be configured to generate control signals for controlling the other circuitry in addition to the control signals 610. In some implementations, the control signals 610 can control the other circuitry along with the pixel array 606. In some implementations, the imaging device 535 (FIG. 5) can include the image sensing system 602.

In some implementations, the control signals 610 can control the pixel array 606 to selectively activate and/or deactivate pixels of the pixel array 606. Images can be captured by selectively reading out pixel values from activated pixels and discarding pixel values from deactivated pixels. In this way, image resolution of the captured images can be adjusted. In some implementations, the control signals 610 can control the pixel array 606 to read out pixel values in bursts (e.g., in a burst capture mode), as individual images (e.g., in a still image mode), and/or at a predetermined rate (e.g., in a video capture mode that captures images at a frame rate such as 30 or 60 frames per second). As used herein, burst capture mode refers to the capture of images over a period of time (e.g., capture of 120 images over a one second period of time). The period of time and the number of images to be captured over the period of time can be different for each burst capture. For example, a first burst capture can capture 120 images over a half-second period of time and a second burst capture can capture 240 images over a one second period of time. Instructions for controlling the pixel array 606 to capture images in a burst capture mode and setting the parameters of a burst capture (e.g., the number of burst captures, the number of images to be captured in each burst capture, and the period of time for each burst capture) can be included in the image capturing instructions 614. Additionally, instructions for capturing images in the still image mode and/or in the video capture mode and setting the parameters of the respective mode (e.g., the number of individual images to be captured and/or the rate at which images are to be captured) can also be included in the image capturing instructions 614. The pixel values 612 read out from the pixel array 606 corresponding to the respective images can be sent to the processing subsystem 608 and/or output from the image sensing system 602 to the processing system 802 where they can be processed.

Although not shown, the processing subsystem 608 includes one or more processors, one or more memories, and RAM. The one or more processors can read one or more programs from the one or more memories and execute them using RAM. The one or more processors can be of any type including but not limited to a central processing unit (CPU), a microprocessor, a microcontroller, a graphical processing unit (GPU), a digital signal processor (DSP), an ASIC, an FPGA, or any combination thereof. In some implementations, the one or more processors can include a plurality of cores, a plurality of arrays, one or more coprocessors, and/or one or more layers of local cache memory. The one or more processors can execute one or more programs stored in one or more memories to perform the operations and/or methods, including parts thereof, described herein.

The one or more memories can be non-volatile and can include any type of memory device that retains stored information when powered off. Non-limiting examples of memory include electrically erasable and programmable read-only memory (EEPROM), flash memory, or any other type of non-volatile memory. At least one memory of the one or more memories can include a non-transitory computer-readable storage medium from which the one or more processors can read instructions. A computer-readable storage medium can include electronic, optical, magnetic, or other storage devices capable of providing the one or more processors with computer-readable instructions or other program code. Non-limiting examples of a computer-readable storage medium include magnetic disks, memory chips, read-only memory (ROM), RAM, an ASIC, a configured processor, optical storage, or any other medium from which a computer processor can read the instructions. The instructions or program code can be configured to perform low latency hierarchical image capture using part or all of the techniques, operations, and/or methods described herein.

In some implementations, the processing subsystem 608 can be configured to generate instructions for controlling the pixel array 606 to capture images based on an operating mode of a device or system such as imaging system 800 (FIG. 8) incorporating the image sensing system 602. For example, in a case that a device or system incorporating the image sensing system 602 is set to a video mode, the processing subsystem 608 can be configured to generate instructions for controlling the pixel array 606 to capture images in the video capture mode. In some implementations, the processing subsystem 608 can be configured to generate instructions for controlling the pixel array 606 to capture images based on data and/or signals received from the one or more position sensors 525 (FIG. 5) and/or the IMU 530 (FIG. 5).

In some implementations, the processing subsystem 608 can be configured to generate instructions for controlling the pixel array 606 to capture images in a hierarchical manner to optimize image quality. For example, the processing subsystem 608 can generate image capturing instructions 614 for controlling the pixel array 606 to capture a first image, the pixel array 606 can capture a first image in response to those instructions, the processing subsystem 608 can perform an image characteristics analysis on the first image and generate image capturing instructions 614 for controlling the pixel array 606 to capture a set of second images depending on the results of the image characteristics analysis, and the pixel array 606 can capture the set of second images in response to those instructions.

To capture images in a hierarchical manner, the processing subsystem 608 is configured to receive a first image captured by the pixel array 606 as an input and detect regions-of-interest (ROIs) in the first image. A region-of-interest (ROI) can correspond to an area of the first image depicting image content that may be of interest. Examples of image content that may be of interest can include, but is not limited to, objects, people, animals, vehicles, characters, text, codes (e.g., quick response codes), and the like. In the case that no regions-of-interest (ROIs) are detected in the first image, the processing subsystem 608 can generate image capturing instructions 614 for controlling the pixel array 606 to capture another first image. In the case that at least one region-of-interest (ROI) is detected in the first image, the processing subsystem 608 can be configured to perform an image characteristic analysis on the first image.

To perform an image characteristic analysis on the first image, the processing subsystem 608 is configured to calculate a plurality of image characteristics of the first image. In some implementations, the plurality of image characteristics of the first image is calculated based on the detected region-of-interest (ROI) or regions-of-interest (ROIs). In some implementations, calculating the plurality of image characteristics of the first image includes determining an image quality level of a region-of-interest (ROI). In some implementations, determining the image quality level of the region-of-interest (ROI) includes determining at least of a brightness level of the region-of-interest and a blur level of the region-of-interest (ROI).

Once the plurality of image characteristics of the first image are calculated, the processing subsystem 608 is configured to generate image capturing instructions for capturing a set of second images. The image capturing instructions for capturing the set of second images are determined based on the plurality of image characteristics. The image capturing instructions for capturing the set of second images can define a number of images to be captured and included in the set of second images. The image capturing instructions for capturing the set of second images can further define a period of time in which the number of images to be captured and included in the set of second images should be captured.

In some implementations, the image capturing instructions for capturing the set of second images can include an exposure time for each image, an image exposure level for each image, an image resolution for each image, a combination thereof, and the like.

The processing subsystem 608 is configured to generate the image capturing instructions for capturing the set of second images by mapping the image capturing parameters determined by the burst capture control unit 704, the super-resolution control unit 706, the image enhancement control unit 708, and the motion detection control unit 710 to corresponding image capturing instructions. To map the image capturing parameters to corresponding image capturing instructions, the processing subsystem 608 is configured to store a set of image capturing instructions for capturing images and select a subset of image capturing instructions from the set of image capturing instructions based on the image capturing parameters. For example, the processing subsystem 608 can be configured to store a data structure that includes information associating each image capturing parameter with an image capturing instruction of the set of image capturing instructions.

Figure 7:
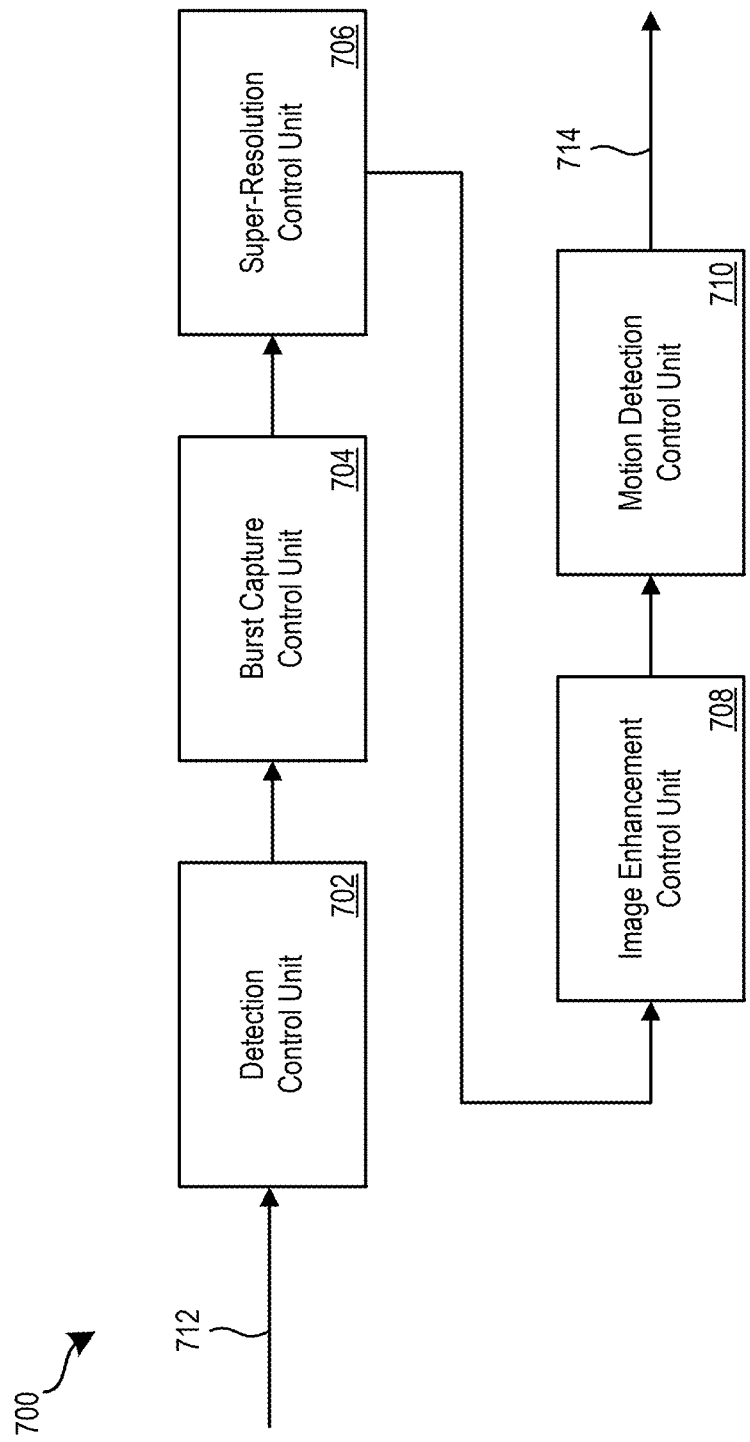
FIG. 7 illustrates an example of a control sequence for performing hierarchical image capture according to some implementations of the present disclosure.

FIG. 7 illustrates an example of a control sequence 700 for performing hierarchical image capture. As shown in FIG. 7, control sequence 700 can include a detection control unit 702, a burst capture control unit 704, a super-resolution control unit 706, an image enhancement control unit 708, and a motion detection control unit 710. Each of the control units can be implemented as a hardware component and/or software component of the hierarchical image capture module 616. The control units can be configured to calculate image characteristics of an image and generate image capturing parameters for capturing a plurality of subsequent images based on the plurality of image characteristics.

In some implementation, the control units can be configured to calculate the image characteristics in a cascaded manner in which the image characteristics calculated by one control unit are used to inform calculating the image characteristics in another control unit. For example, as shown in FIG. 7, the image characteristics calculated by the burst capture control unit 704 can be used to inform the super-resolution control unit 706 which can be used to inform the image enhancement control unit 708 which can be used to inform the motion detection control unit 710. In some implementations, the control units can be configured to calculate the image characteristics concurrently in which the calculation of image characteristics by one control unit is performed concurrently with the calculation of image characteristics by another control unit. The foregoing arrangement is not intended to be limiting. For example, while the foregoing arrangement is described with respect to respective control units, other control units can be provided, the functions of each control unit can be combined with the functions other control units, and/or a single control unit can be provided in which the functions of the respective control units can be performed.

The detection control unit 702 is configured to detect regions-of-interest (ROI) in images. To detect regions-of-interest (ROI) in images, the detection control unit 702 is configured to receive images 712 captured by the pixel array 606 as an input and detect regions-of-interest (ROI) in those images 712. For example, the detection control unit 702 can receive the first image as an input and detect one or more regions-of-interest (ROI) in the first image. A region-of-interest (ROI) can correspond to an area of an image that depicts image content that may be of interest. Examples of image content that may be of interest can include, but is not limited to, objects, people, animals, vehicles, characters, text, codes (e.g., quick response codes), and the like. The detection control unit 702 can detect regions-of-interest (ROIs) in images using any suitable object detection algorithm(s) or machine learning model(s) trained to detect content in images. For each region-of-interest (ROI) detected, the detection control unit 702 is configured to generate a bounding box that encloses an area of the image that includes the region-of-interest (ROI) and coordinates for the bounding box that identifies the position within the image where the bounding box is located. For example, the pixels of the image can be associated with an image coordinate system and the coordinates for a given bounding box can identify which pixels of the image are included within the boundaries or borders of the bounding box. The detection control unit 702 can be configured to provide the image, bounding boxes generated for the image, and coordinates for bounding boxes generated for the image to the burst capture control unit 704.

The burst capture control unit 704 is configured to determine an image quality level of an area or areas of the first image corresponding to a region-of-interest (ROI) or regions-of-interest (ROIs), determine whether an image quality level for the first image is below a predetermined threshold, and, in the case that the image quality level for the first image is below the predetermined threshold, generate an image capturing parameter for capturing images in the burst capture mode. The burst capture control unit 704 is configured to determine an image quality level of an area corresponding to a region-of-interest (ROI) based on a plurality of image quality factors. Examples of image quality factors include, but is not limited to, image sharpness or blur level, image brightness level, image noise, dynamic range, color constancy, image contrast, and the like. The burst capture control unit 704 can be configured to determine an image quality level for an image by calculating an image quality level for each region-of-interest (ROI) area of the image based on the pixel values of the pixels of the respective region-of-interest (ROI) area and averaging the image quality levels for all of the regions-of-interest (ROIs) in the image. For example, if the image includes a single region-of-interest (ROI), then the image quality level for the image would be the image quality level of the area of the image corresponding to the region-of-interest (ROI). In another example, if the image includes two regions-of-interest (ROIs), then the image quality level for the image would be average of the image quality levels of the areas of the image corresponding to the regions-of-interest (ROIs). In some implementations, the average can be a weighted average. For example, if an image quality level for one region-of-interest (ROI) is weighted with a first weight and an image quality level for the other region-of-interest (ROI) is weighted with a second weight, then the image quality level for the image could be a weighted average of the image quality levels of the areas of the image corresponding to the regions-of-interest (ROIs). In some implementations, each region-of-interest (ROI) can be weighted based on input received from a user and/or determined algorithmically. The burst capture control unit 704 can calculate image quality level for a region-of-interest (ROI) in an image using any suitable image quality level calculation algorithm(s) and/or machine learning model(s) trained to calculate image quality level. The burst capture control unit 704 can be configured to provide the image capturing parameter for capturing images in the burst capture mode and the image quality level of the image to the super-resolution control unit 706.

The super-resolution control unit 706 is configured to receive the image quality level of the first image from the burst capture control unit 704 and determine a number of images to be captured in the burst capture mode based on the image quality level. The super-resolution control unit 706 is configured to determine the number of images to be captured in the burst capture mode based on the image quality level by mapping the image quality level of the first image to one resolution factor of a list of resolution factors. Each resolution factor of the list of resolution factors is associated with a number of images to be captured at a given image quality level. A resolution factor as used herein refers to the amount the resolution of an image should be increased by. For example, a resolution factor 2× indicates that the resolution of the first image should be doubled. In another example, a resolution factor 4× indicates that the resolution of the first image should be quadrupled. By mapping the image quality level of the first image to a resolution factor of the list of resolution factors, the number of images to be captured for the mapped resolution factor can be identified. For example, an image having a lower image quality level can be mapped to a higher resolution factor which can be associated with a greater number of images to be captured in the burst capture. In some implementations, the super-resolution control unit 706 can be configured to determine the number of images to be captured in the burst capture mode based on the image quality level using a machine learning model trained to predict a resolution factor and a number of images to be captured in a burst capture mode needed to achieve a satisfactory image quality level. The super-resolution control unit 706 can be configured to provide the image capturing parameter for capturing images in the burst capture mode and the number of images to be captured in the burst capture mode to the image enhancement control unit 708.

The image enhancement control unit 708 is configured to receive the number of images to be captured in the burst capture mode from the super-resolution control unit 706 and determine an exposure level for image to be captured in the burst capture mode. An exposure level can be determined for each image to be captured in the burst capture mode such that the pixel array 606 can be controlled to capture an image in the burst capture mode according to the exposure level determined for that image. The pixel array 606 can be controlled to capture an image according to the exposure level determined for that image by setting an aperture size, shutter speed, and exposure time for pixels of the pixel array 606. The image enhancement control unit 708 is configured to determine an exposure level for capturing each image of the images in the burst capture mode based on the image quality level. The image enhancement control unit 708 can be configured to determine an exposure level for capturing each image of the images in the burst capture mode based on the image quality level using a machine learning model(s) trained to predict an exposure level needed to achieve a satisfactory image quality level. The image enhancement control unit 708 can be configured to provide the image capturing parameter for capturing images in the burst capture mode, the number of images to be captured in the burst capture mode, and the exposure level for each image to the motion detection control unit 710.

The motion detection control unit 710 is configured to determine motion characteristics of a region-of-interest (ROI) or regions-of-interest (ROIs) and determine the image capture rate at which images to be captured in the burst capture mode should be captured based on the motion characteristics. For each region-of-interest (ROI), the motion detection control unit 710 can be configured to predict whether the region-of-interest (ROI) is stationary or moving, and, if the region-of-interest (ROI) is moving, predict a movement speed and direction of the region-of-interest (ROI). In some implementations, for each region-of-interest (ROI), the motion detection control unit 710 can be configured to predict whether the region-of-interest (ROI) is changing in size (e.g., getting larger or smaller), and, if the region-of-interest (ROI) is changing in size, predicting the speed and direction at which the region-of-interest (ROI) is changing in size. In some implementations, for each region-of-interest (ROI), the motion detection control unit 710 can be configured to predict an object depth for the region-of-interest. The motion detection control unit 710 can be configured to determine motion characteristics of a region-of-interest (ROI) using one or more motion detection algorithm(s) or machine learning models trained to recognize motion in images. In some implementations, the motion detection control unit 710 can be configured to determine motion characteristics of a region-of-interest (ROI) based on data and/or signals received from an IMU such as IMU 530 (FIG. 5), a motion detector, and the like. The motion detection control unit 710 is configured to output the image capturing parameters 714 including the image capturing parameter for capturing images in the burst capture mode, the number of images to be captured in the burst capture mode, the exposure level for each image to be captured in the burst capture mode, and the image capture rate at which images to be captured in the burst capture mode should be captured.

Once the processing subsystem 608 generates the image capturing instructions for capturing the set of second images based on the image capturing parameters, the controller 604 can generate control signals 610 for controlling the pixel array 606 to capture the set of second images and the pixel array 606 can capture the set of second images based on the control signals 610. The first image and the set of second images can be stored on a server such as server 810 (FIG. 8) of imaging system 800 (FIG. 8).

Figure 8:
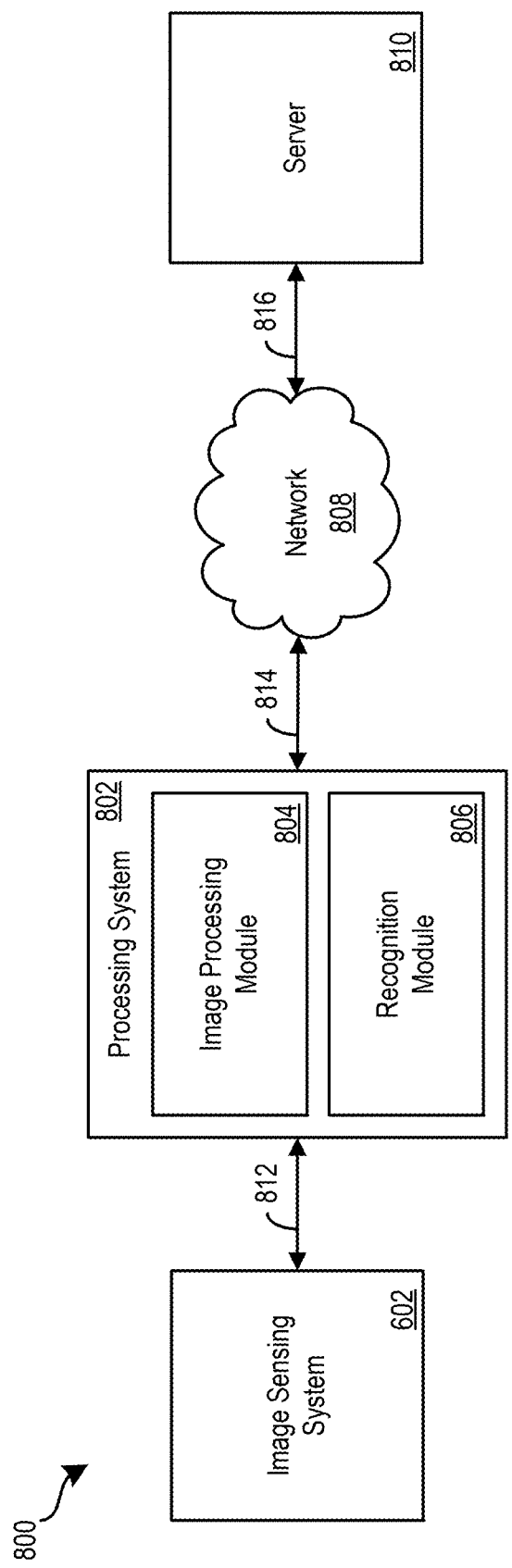
FIG. 8 illustrates an example of an imaging system according to some implementations of the present disclosure.

FIG. 8 illustrates an example of an imaging system 800 in which image sensing system 602 can be included. In some implementations, the imaging system 800 can be an implementation of the system 500 (FIG. 5). As shown in FIG. 8, imaging system 800 includes the image sensing system 602, processing system 802, network 808, and server 810. Image sensing system 602 can be connected to processing system 802 using link 812, which can be any suitable wired or wireless link. Using link 812, the processing system 802 can receive images captured by the image sensing system 602. In some implementations, the captured images can be the set of images captured by the image sensing system 602 in response to the image capturing instructions 614 generated by the hierarchical image capture module 616. The processing system 802 can process the images to enhance the images, derive information from the images, recognize image content in the images, and the like.

The processing system 802 can be connected to the network 808 using link 814 and network 808 can be connected to server 810 using link 816. Links 814 and 816 can also be any suitable wired or wireless links. Using links 814 and 816, the processing system 802 can send images and other information through the network 808 to the server 810 for storage and/or further processing. For example, processing system 802 can send processed images, information derived from those images, information identifying recognized image content depicted by the images, and/or a combination thereof to the server 810 for storage and/or further processing. In some implementations, the processing system 802 can send images captured by the image sensing system 602 to the server 810 for storage and retrieve or access them to process them at a later time. Upon retrieving or accessing an image or images, processing system 802 can process the image or images and store the processed image or images on the server 810. In some implementations, the processing system 802 can retrieve or access from the server 810 the set of images captured by the image sensing system 602 in response to the image capturing instructions 614 generated by the hierarchical image capture module 616. Network 808 can be any kind of network, wired or wireless, which can facilitate communications between the processing system 802 and the server 810. Server 810 can be configured with hardware and software that enables the server 810 to store and manage the processed images and other information associated with the processed images such as the information derived from those images, information identifying recognized image content depicted by those images, and/or a combination thereof. Server 810 can be any kind of server (e.g., a physical server and/or a cloud-based server). The foregoing arrangement is not intended to be limiting. For example, although the processing system 802 is shown as being separate from the image sensing system 802, the processing system 802 and/or one or more components or functions of the processing system 802 can be implemented by a component of the image sensing system 602 such controller 604 and/or processing subsystem 608.

Although not shown, the processing system 802 includes one or more memories, one or more processors, and RAM. The one or more processors can read one or more programs from the one or more memories and execute them using RAM. The one or more processors can be of any type including but not limited to a microprocessor, a microcontroller, a graphical processing unit, a digital signal processor, an ASIC, an FPGA, or any combination thereof. In some implementations, the one or more processors can include a plurality of cores, a plurality of arrays, one or more coprocessors, and/or one or more layers of local cache memory. The one or more processors can execute one or more programs stored in one or more memories to perform the operations and/or methods, including parts thereof, disclosed herein.

The one or more memories can be non-volatile and can include any type of memory device that retains stored information when powered off. Non-limiting examples of memory include electrically erasable and programmable read-only memory (EEPROM), flash memory, or any other type of non-volatile memory. At least one memory of the one or more memories can include a non-transitory computer-readable storage medium from which the one or more processors can read instructions. A computer-readable storage medium can include electronic, optical, magnetic, or other storage devices capable of providing the one or more processors with computer-readable instructions or other program code. Non-limiting examples of a computer-readable storage medium include magnetic disks, memory chips, read-only memory (ROM), RAM, an ASIC, a configured processor, optical storage, or any other medium from which a computer processor can read the instructions. The instructions or program code can be configured to perform low latency hierarchical image capture using part or all of the techniques, operations, and/or methods described herein.

As shown in FIG. 8, the processing system 802 also includes an image processing module 804 and a recognition module 806. These modules, which are presented as part of the processing system 802, can be implemented as individual hardware and/or software components or may be implemented together, such as in the form of software that can be executed by the one or more processors of the processing subsystem 802.

The image processing module 804 is configured to process the images captured by and received from the image sensing system 602 and/or retrieved or accessed from the server 810. The processing performed by the image processing module 804 can include, but is not limited to, super-resolution processing, image enhancement processing, and the like. In some implementations, in the case the processing system 802 receives, retrieves, or accesses the set of images captured by the image sensing system 602 in response to the image capturing instructions 614 generated by the hierarchical image capture module 616, the image processing module 804 can be configured to combine the images of the set of images into a combined image. The image processing module 804 can be configured to combine the images of the set of images into a combined image by registering each image of the set of second images to each other to form a set of registered images and merging the image in the set of registered images to form the combined image. To register and combine images, the image processing module 804 can use any suitable image alignment and merging technique.

The recognition module 806 is configured to recognize image content in images processed by the image processing module 804. Image content can include, but is not limited to, objects, people, animals, vehicles, characters, text, codes (e.g., quick response codes), and the like. In some implementations, the recognition module 806 is configured to recognize image content in the combined image. In some implementations, the recognition module 806 can recognize image content in the combined image by detecting a region-of-interest (ROI) in the combined image, detecting an object in the region-of-interest (ROI) in the combined image, and classifying the object detected in the region-of-interest (ROI) in the combined image. In some implementations, in the case the combined image is formed from the set of images captured by the image sensing system 602 in response to the image capturing instructions 614 generated by the hierarchical image capture module 616, coordinates of the region-of-interest (ROI) in the combined image can correspond to coordinates of the region-of-interest (ROI) in the initial or first image detected by the hierarchical image capture module 616.

Image content can be recognized using one or more machine learning models that are trained to recognize image content. A trained machine learning model can be provided for each item or type of image content that is to be recognized. For example, the recognition module 806 can use a machine learning model trained to recognize people to recognize people depicted by an image or images and can use a machine learning model trained to recognize text (e.g., an OCR model) to recognize textual content depicted by an image or images. In some implementations, the one or more machine learning models included in the recognition module 806 can be pre-trained and fine-tuned for recognizing an item or type of image content. The one or more machine learning models can be trained and/or fine-tuned using any suitable training and/or fine-tuning technique. Training data for training and/or fine-tuning the one or more machine learning models can include training images that are labeled with one or more annotations that identify the item or type of image content depicted by the training images and where in each training image the image content is located.

Upon recognizing image content, the processing system 802 can store the processed image and/or combined image (in the case of hierarchical image capture) and information identifying the recognized image content on the server 810. In some implementations, the information identifying the recognized image content can include, but is not limited to, a class of the recognized image content (e.g., text, people, animals) and a position or coordinates within the processed image and/or combined image where the recognized image content is located. In the case the recognized object is text, the information can include the text, characters of the text, tokens representing the text, and the like.

Figure 9:
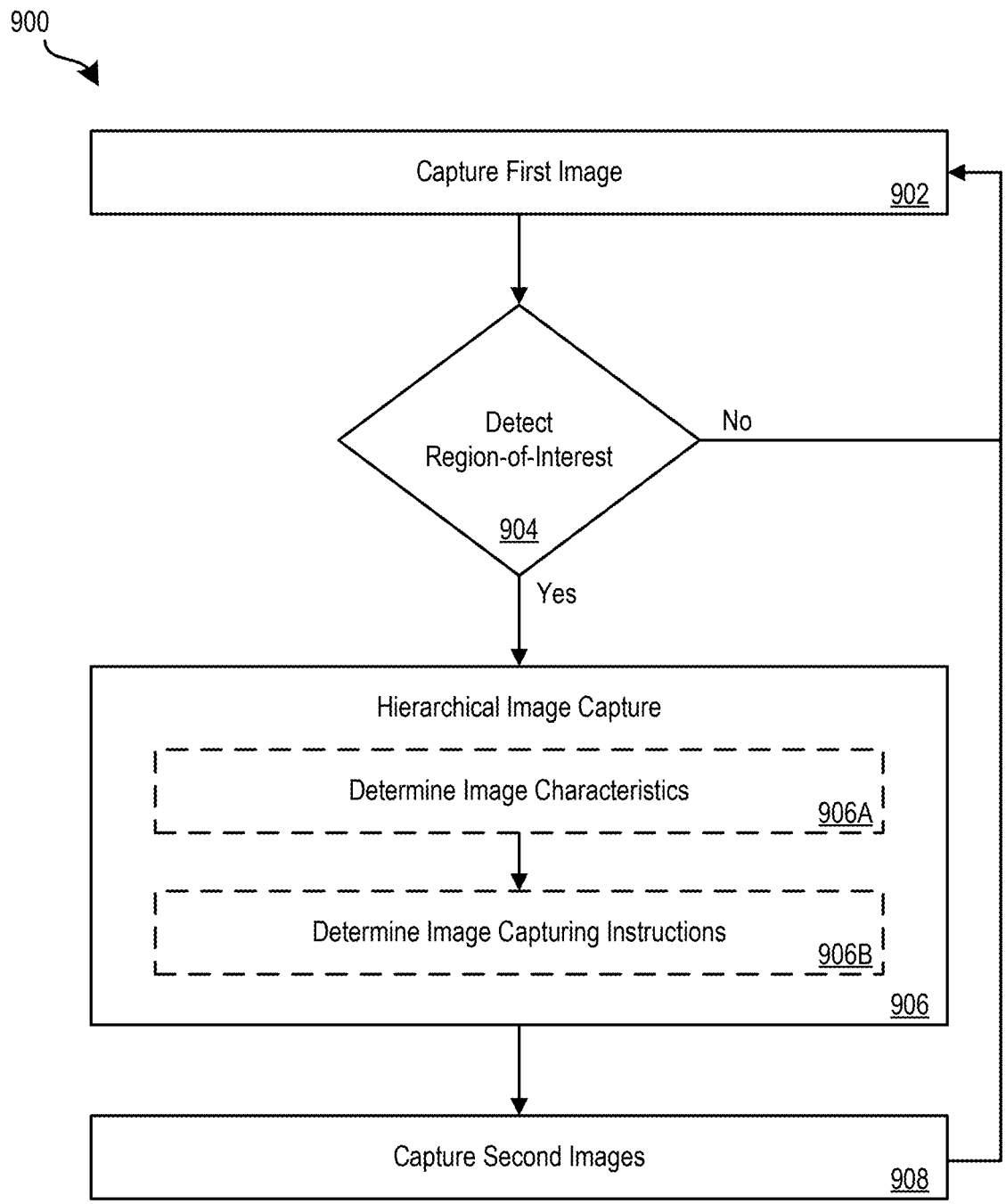
FIG. 9 illustrates a method for performing low latency hierarchical image capture according to some implementations of the present disclosure.

FIG. 9 illustrates a method 900 for performing low latency hierarchical image capture. The processing depicted in FIG. 9 may be implemented in software (e.g., code, instructions, program) executed by a processing system such as processing subsystem 608 of the image sensing system 602. The software may be stored on a non-transitory computer-readable storage medium (e.g., a memory device). The method 900 is intended to be illustrative and non-limiting. For example, although FIG. 9 depicts the various processing steps occurring in a particular sequence or order, in other embodiments, the steps may be performed in some different order or some steps may also be performed in parallel.

At block 902, a first image is captured. In some implementations, the first image can be captured using a pixel array of an image sensing system such as the pixel array 606 of the image sensing system 602.

At block 904, a determination is made as to whether a region-of-interest (ROI) is detected in the first image. In the case that it is determined that a region-of-interest (ROI) is not detected in the first image, flow returns to block 902 where another first image can be captured. In the case that it is determined that a region-of-interest (ROI) is detected in the first image, hierarchical image capture is performed at block 906.

To perform hierarchical image capture, at block 906A, a plurality of image characteristics of the first image is determined. In some implementations, the plurality of image characteristics of the first image is determined based on the region-of-interest (ROI). In some implementations, determining the plurality of image characteristics of the first image includes determining an image quality level of the region-of-interest (ROI). In some implementations, determining the image quality level of the region-of-interest (ROI) further includes determining at least one of a brightness level of the region-of-interest (ROI) and a blur level of the object in the region-of-interest (ROI). In some implementations, the plurality of image characteristics can be determined using a processing subsystem of an image sensing system such as the processing subsystem 608 of the image sensing system 602.

At block 906B, image capturing instructions for capturing a set of second images are determined. In some implementations, the image capturing instructions for capturing the set of second images are determined based on the plurality of image characteristics. In some implementations, a number of images included in the set of second images is defined by the image capturing instructions. In some implementations, the set of second images is captured within a period of time defined by the image capturing instructions.

At block 908, the set of second images is captured. In some implementations, the set of second images can be captured using the pixel array 606 of the image sensing system 602. The first image and the set of second images can be stored on a server such as the server 810 of the imaging system 800.

Figure 10:
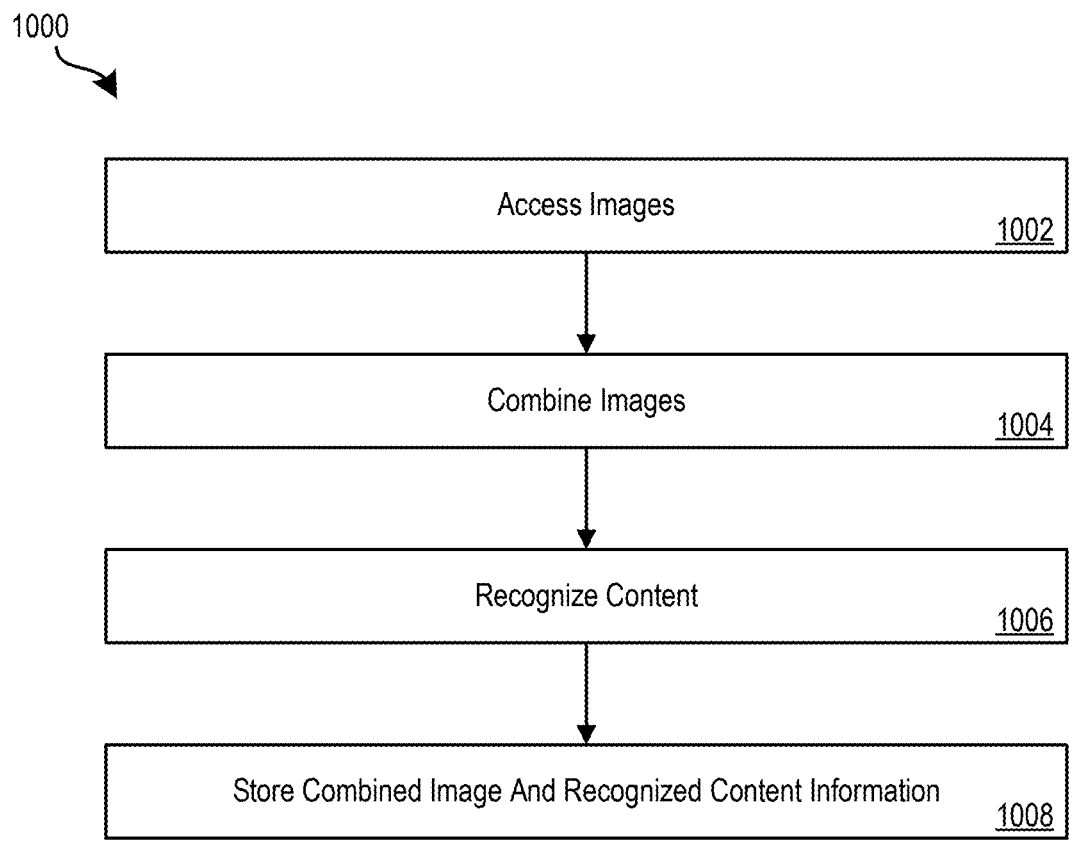
FIG. 10 illustrates a method for recognizing image content according to some implementations of the present disclosure.

FIG. 10 illustrates a method 1000 for recognizing image content. The processing depicted in FIG. 10 may be implemented in software (e.g., code, instructions, program) executed by a processing system such as processing system 802 of the imaging system 800. The software may be stored on a non-transitory computer-readable storage medium (e.g., a memory device). The method 1000 is intended to be illustrative and non-limiting. For example, although FIG. 10 depicts the various processing steps occurring in a particular sequence or order, in other embodiments, the steps may be performed in some different order or some steps may also be performed in parallel.

At block 1002, a set of images can be accessed. In some implementations, the set of images can be accessed from a server such as the server 810 of the imaging system 800. In some implementations, the set of images can be the set of second images captured based on image capturing instructions generated by the hierarchical image capture performed at block 906.

At block 1004, the set of images is combined into a combined image. In some implementations, in the case that the set of images is the set of second images captured based on image capturing instructions performed at block 906, the combined image can be referred to as a third image. In some implementations, combining the set of second images into the combined image includes registering each image of the set of second images to one another to form a set of registered images and merging images in the set of registered images to form the combined image.

At block 1006, an object is recognized in the combined image. In some implementations, recognizing the object in the combined image includes detecting a region-of-interest (ROI) in the combined image, detecting an object in the region-of-interest (ROI) in the combined image, and classifying the object detected in the region-of-interest (ROI) in the combined image. In some implementations, in the case that the set of images is the set of second images captured based on image capturing instructions generated by the hierarchical image capture performed at block 906, coordinates of the region-of-interest (ROI) in the combined image can correspond to coordinates of the region-of-interest (ROI) in the first image captured at block 902.

At block 1008, the combined image and information identifying the recognized object can be stored on the server. In some implementations, the information identifying the recognized object can include, but is not limited to, a class of the recognized object and a position or coordinates within the combined image where the recognized object is located. In the case the recognized object is text, the information can include the text, characters of the text, tokens representing the text, and the like.

While some examples of methods and systems herein are described in terms of software executing on various machines, the methods and systems may also be implemented as specifically configured hardware, such as an ASIC or FPGA specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random-access memory (RAM) coupled to the processor. The processor executes computer-executable program instructions stored in memory, such as executing one or more computer programs. Such processors may comprise a microprocessor, a digital signal processor (DSP), an ASIC, FPGA, and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

What is claimed is:

1. A method comprising:
    capturing, using a pixel array of an image sensing system, a first image;
    detecting a region-of-interest in the first image;
    determining a plurality of image characteristics of the first image, wherein determining the plurality of image characteristics of the first image comprises determining an image quality level of the region-of-interest;
    determining, based on the plurality of image characteristics, image capturing instructions for capturing a set of second images;

capturing, using the pixel array of the image sensing system, the set of second images;
combining the set of second images into a third image; and
recognizing the object in the third image.

2. The method of claim 1, wherein the plurality of image characteristics is determined using a processing subsystem of the image sensing system.

3. The method of claim 1, wherein determining the image quality level of the region-of-interest comprises determining at least one of a brightness level of the region-of-interest and a blur level of the region-of-interest.

4. The method of claim 1, wherein a number of images included in the set of second images is defined by the image capturing instructions.

5. The method of claim 1, wherein the set of second images is captured within a period of time defined by the image capturing instructions.

6. The method of claim 1, wherein combining the set of second images comprises registering each image of the set of second images to one another to form a set of registered images and merging images in the set of registered images to form the third image.

7. The method of claim 1, wherein recognizing the object in the third image comprises:
detecting a region-of-interest in the third image, wherein coordinates of the region-of-interest in the third image correspond to coordinates of the region-of-interest in the first image;
detecting an object in the region-of-interest in the third image; and
classifying the object detected in the region-of-interest in the third image.

8. An imaging system comprising:
an image sensing system;
a processing system, wherein the imaging system is configured to:
capture, using a pixel array of the image sensing system, a first image;
detect a region-of-interest in the first image;
determining a plurality of image characteristics of the first image, wherein determining the plurality of image characteristics of the first image comprises determining an image quality level of the region-of-interest;
determine, based on the plurality of image characteristics, image capturing instructions for capturing a set of second images;
capture, using the pixel array of the image sensing system, the set of second images;
combine the set of second images into a third image; and
recognize the object in the third image.

9. The imaging system of claim 8, wherein the plurality of image characteristics is determined using a processing subsystem of the image sensing system.

10. The imaging system of claim 8, wherein determining the image quality level of the region-of-interest comprises determining at least one of a brightness level of the region-of-interest and a blur level of the region-of-interest.

11. The imaging system of claim 8, wherein a number of images included in the set of second images is defined by the image capturing instructions.

12. The imaging system of claim 8, wherein the set of second images is captured within a period of time defined by the image capturing instructions.

13. The imaging system of claim 8, wherein combining the set of second images comprises registering each image of the set of second images to one another to form a set of registered images and merging images in the set of registered images to form the third image.

14. The imaging system of claim 8, wherein recognizing the object in the third image comprises:
detecting a region-of-interest in the third image, wherein coordinates of the region-of-interest in the third image correspond to coordinates of the region-of-interest in the first image;
detecting an object in the region-of-interest in the third image; and
classifying the object detected in the region-of-interest in the third image.

15. One or more non-transitory computer-readable media storing computer-readable instructions that, when executed by one or more processors, cause an imaging system to perform operations comprising:
capturing, using a pixel array of an image sensing system, a first image;
detecting a region-of-interest in the first image;
determining a plurality of image characteristics of the first image, wherein determining the plurality of image characteristics of the first image comprises determining an image quality level of the region-of-interest;
determining, based on the plurality of image characteristics, image capturing instructions for capturing a set of second images;
capturing, using the pixel array of the image sensing system, the set of second images;
combining the set of second images into a third image; and
recognizing the object in the third image.

16. The one or more non-transitory computer-readable media of claim 15, wherein the plurality of image characteristics is determined using a processing subsystem of the image sensing system.

17. The one or more non-transitory computer-readable media of claim 15, wherein determining the image quality level of the region-of-interest comprises determining at least one of a brightness level of the region-of-interest and a blur level of the region-of-interest.

18. The one or more non-transitory computer-readable media of claim 15, wherein a number of images included in the set of second images is defined by the image capturing instructions.

19. The one or more non-transitory computer-readable media of claim 15, wherein the set of second images is captured within a period of time defined by the image capturing instructions.

20. The one or more non-transitory computer-readable media of claim 15, wherein combining the set of second images comprises registering each image of the set of second images to one another to form a set of registered images and merging images in the set of registered images to form the third image.

* * * * *